United States Patent
Wood et al.

(10) Patent No.: US 6,608,685 B2
(45) Date of Patent: Aug. 19, 2003

(54) TUNABLE FABRY-PEROT INTERFEROMETER, AND ASSOCIATED METHODS

(75) Inventors: Christopher S. Wood, Boulder, CO (US); Jason R. Ensher, Lafayette, CO (US); Alan J. Richards, Boulder, CO (US)

(73) Assignee: ILX Lightwave Corporation, Bozeman, MT (US)

( * ) Notice: Subject to any disclaimer, the term of this patent is extended or adjusted under 35 U.S.C. 154(b) by 0 days.

(21) Appl. No.: 09/855,335

(22) Filed: May 14, 2001

(65) Prior Publication Data

US 2001/0055119 A1 Dec. 27, 2001

Related U.S. Application Data

(60) Provisional application No. 60/204,283, filed on May 15, 2000.

(51) Int. Cl.$^7$ .................................................. G01B 9/02
(52) U.S. Cl. ........................................ 356/519; 356/480
(58) Field of Search ............................... 356/519, 521, 356/454, 480; 359/577, 579, 580, 584, 589, 590

(56) References Cited

U.S. PATENT DOCUMENTS

| | | |
|---|---|---|
| 3,625,589 A | 12/1971 | Snitzer |
| 3,645,603 A | 2/1972 | Smith |
| 4,384,760 A | 5/1983 | Alferness |
| 4,466,699 A | 8/1984 | Droessler et al. |
| 4,474,424 A | 10/1984 | Wagner |
| 4,550,975 A | 11/1985 | Levinson et al. |
| 4,564,289 A | 1/1986 | Spillman, Jr. |
| 4,729,622 A | 3/1988 | Pavlath |
| 4,753,507 A | 6/1988 | DePaula et al. |
| 4,789,219 A | 12/1988 | Layne |
| 4,813,756 A | 3/1989 | Frenkel et al. |
| 4,861,136 A | 8/1989 | Stone et al. |
| 4,923,290 A | 5/1990 | Brinkmeyer et al. |
| 4,960,319 A | 10/1990 | Dankowych |
| 4,979,235 A | 12/1990 | Rumbaugh et al. |
| 4,988,169 A | 1/1991 | Walker |
| 5,004,312 A | 4/1991 | Shimizu |

(List continued on next page.)

OTHER PUBLICATIONS

Hasuaki Kidoh, Yasuharu Suematsu, Fellow, Iee, and Kazuhito Furuya, "Polarization Control on Output of single–Mode Optical Fibers", Ilee Journal of Quantum electronics, vol. QE–17, No. 6, Jun. 1981, pp. 991–994.

R. P. Tatam, C. N. Pannell, J. D. C. Jones, and D. A. Jackson, "Full Polarization State Control Utilizing Linearly Birefringent Monomode Optical Fiber", Journal of Lightwave technology, vol. LT–5, No. 7, Jul. 1987, pp. 980–984.

Mark Johnson, "In–Line fiber–optical transformer", Applied Optics, vol. 18, No. 9, May 1, 1979, p. 1288–1289, Bedford MA 01730.

(List continued on next page.)

Primary Examiner—Robert H. Kim
Assistant Examiner—Thomas R Artman
(74) Attorney, Agent, or Firm—Curtis A. Vock; Lathrop & Gage L.C.

(57) ABSTRACT

A miniature, fiber-coupled Fabry-Perot interferometer has a piezoelectric transducer coupled to first and second collimating lenses. The collimating lenses collimate and interfere light energy within a gap formed between the lenses as part of the interferometer. Preferably, the lenses are matched mode gradient index lenses. Light energy coupled to the collimating lens is thus collimated and interfered within the gap. The piezoelectric transducer expands or contracts to adjust the gap, thereby adjusting the free spectral range of the interferometer. An input fiber provides input to the interferometer; an output fiber carries processed light energy of the selected free spectral range to external devices and optical systems. Metal coatings may be used to provide a capacitive feedback of lens position to calibrate the gap and, thus, the free spectral range.

45 Claims, 5 Drawing Sheets

U.S. PATENT DOCUMENTS

| | | | |
|---|---|---|---|
| 5,039,201 A | | 8/1991 | Liu |
| 5,041,779 A | * | 8/1991 | Hales .......................... 356/519 |
| 5,062,684 A | * | 11/1991 | Clayton et al. ............. 356/480 |
| 5,073,004 A | | 12/1991 | Clayton et al. |
| 5,115,480 A | | 5/1992 | Large |
| 5,159,481 A | | 10/1992 | Maeda |
| 5,191,387 A | | 3/1993 | Ichikawa et al. |
| 5,212,584 A | | 5/1993 | Chung |
| 5,212,743 A | | 5/1993 | Heismann |
| 5,212,745 A | | 5/1993 | Miller |
| 5,251,275 A | | 10/1993 | Kuriyama et al. |
| 5,283,845 A | | 2/1994 | Ip |
| 5,287,214 A | | 2/1994 | Robertson et al. |
| 5,336,883 A | | 8/1994 | Hobby et al. |
| 5,361,155 A | | 11/1994 | Chiaroni et al. |
| 5,408,545 A | | 4/1995 | Lee et al. |
| 5,418,641 A | * | 5/1995 | Hendow et al. ............ 359/346 |
| 5,453,827 A | | 9/1995 | Lee |
| 5,471,545 A | | 11/1995 | Negami et al. |
| 5,481,402 A | | 1/1996 | Cheng et al. |
| 5,561,726 A | | 10/1996 | Yao |
| 5,592,314 A | * | 1/1997 | Ogasawara et al. ......... 356/519 |
| 5,606,439 A | | 2/1997 | Wu |
| 5,612,824 A | | 3/1997 | Si et al. |
| 5,629,995 A | | 5/1997 | Duck et al. |
| 5,633,959 A | | 5/1997 | Niki et al. |
| 5,642,448 A | | 6/1997 | Pan et al. |
| 5,657,151 A | | 8/1997 | Swan et al. |
| 5,666,225 A | | 9/1997 | Colbourne |
| 5,682,445 A | | 10/1997 | Smith |
| 5,682,452 A | | 10/1997 | Takahashi |
| 5,684,632 A | | 11/1997 | Shimizu |
| 5,739,945 A | | 4/1998 | Tayebati |
| 5,799,121 A | | 8/1998 | Duck et al. |
| 5,903,684 A | | 5/1999 | Payton |
| 5,917,626 A | | 6/1999 | Lee |
| 5,943,136 A | * | 8/1999 | Pipino et al. ............... 356/440 |
| 6,005,995 A | | 12/1999 | Chen et al. |
| 6,040,944 A | | 3/2000 | Pan et al. |
| 6,173,091 B1 | * | 1/2001 | Reich .......................... 385/12 |
| 6,222,958 B1 | * | 4/2001 | Paiam .......................... 385/24 |
| 6,377,350 B1 | * | 4/2002 | Paldus et al. ............... 356/519 |
| 6,381,022 B1 | * | 4/2002 | Zavracky .................... 356/519 |
| 6,392,753 B1 | * | 5/2002 | Logunov .................... 356/519 |

OTHER PUBLICATIONS

R. Ulrich, "Polarization stabilization on single–mode fiber", Appl. Phys. Lett. 35(11), Dec. 1, 1979, pp. 840–842.

G. Walker et al., "Rugged, all–fiber endless polarisation controller", Electronics Letters 24, 1988, p. 1353.

N. Walker et al., "Endless Polarisation Control Using Four Fibre Squeezers", Electronics Letters 23, 1987, p. 290.

R. Noe, "Polarisation Control in Optical Communications", Electronics Letters, 1986 2 pages.

R. Noe, "Endless Polarisation Control experiment with Three Elements of Limited Birefringence Range", Electronics Letters 22, 1986, p. 1341.

W. L. Barnes, "Liquid Switch and Polarisation Controller", Electronics Letters, 1988, 3 pages.

Michiharu Nakumara and Shinji Tsuji, "Single–Mode Semiconductor Injection Laser for Optical Fiber Communications", Ilee Journal of Quantum Electronics, vol. QE–17, No. 6, Jun. 1981, 12 pages.

* cited by examiner

TUNABLE FABRY-PEROT INTERFEROMETER, AND ASSOCIATED METHODS

RELATED APPLICATIONS

This application claims priority to U.S. Provisional Application No. 60/204,283, entitled "Miniature Fiber Coupled Fabry-Perot Interferometer, filed on May 15, 2000 and incorporated herein by reference.

BACKGROUND OF THE INVENTION

Late in the 1900s, Fabry and Perot learned of the potential of an interferometer formed by two parallel surfaces with highly reflective coatings and variable separation. By the 1970s, the basic Fabry-Perot interferometer had evolved to support many applications involving multiple beam interferometry, including applications with laser cavities and non-planar surfaces.

The Fabry-Perot interferometer is still widely used today. However, with increasing demands on performance, and with the miniaturization of optical systems, improvements are sought. One object of the invention is to therefore provide a Fabry-Perot interferometer that is small and finely tunable, as compared to the prior art. This object and others will be apparent in the description that follows.

SUMMARY OF THE INVENTION

The following patents provide useful background information for the invention: U.S. Pat. Nos. 6,040,944; 6,005,995; 5,917,626; 5,799,121; 5,739,945; 5,684,632; 5,682,452; 5,666,225; 5,642,448; 5,629,995; 5,612,824; 5,606,439; 5,481,402; 5,453,827; 5,361,155; 5,287,214; 5,283,845; 5,251,275; 5,212,745; 5,212,584; 5,073,004; 5,062,684; 5,039,201; 4,861,136; 4,813,756; 4,789,219; 4,550,975; 4,474,424; 4,466,699. Each of the afore-mentioned patents is expressly incorporated herein by reference.

The following articles and books provide useful background information for the invention, and are thus incorporated herein by reference: M. Hercher, *The spherical mirror Fabry-Perot interferometer*, Appl. Opt. 7, p. 951 (May 1968); K. Repasky et al., *High finesse interferometers*, Appl. Opt. 34, p. 2615 (May 1995); A. Siegman, *Lasers*, University Science Books, (1986); and *The application of capacitance micrometry to the control of Fabry-Perot etalons*, J. Phys. E 17, p. 48–54, (1984).

The invention of one aspect provides a miniature, fiber-coupled Fabry-Perot interferometer with a piezoelectric transducer and a collimating lens. As used herein, "lens" generally refers to a plurality of lenses or optical components used to perform the function of collimating light energy across a gap as part of the interferometer. Specifically, in accord with this aspect, light energy is coupled to the collimating lens and the collimating lens forms a substantially collimated beam across the gap; the piezoelectric transducer expands or contracts to adjust the gap, thereby adjusting the free spectral range of the interferometer. Preferably, one or more lens surfaces forming the gap are coated as optically reflective surfaces (i.e., to form mirrors or partial mirrors); these surfaces preferably include those that face each other to form the gap. The surfaces may be planar or curved. Preferably, surfaces of the lens that do not form the optically resonant gap are coated with anti-reflective coatings.

In one aspect, the transducer is contoured with a shape facilitating the alignment and placement of the lens with the transducer. By way of example, in one aspect the contour shape of part of the transducer includes a V-groove, which facilitates both alignment and tunability, as described herein.

In another aspect, the lens of the invention utilizes gradient index ("GRIN") lenses. The GRIN lenses facilitate coupling to fiber optics, which provide the light energy for the interferometer, and further simplifies collimation within the interferometer. Preferably, highly reflective optical coatings are applied to the GRIN lenses to form the cavity across the gap. In a further aspect, a capacitive sensor is integrated with the interferometer to provide for absolute optical, and/or spatial, calibrations. GRIN lenses of the invention may for example include 0.75-pitch or 1.25-pitch.

As understood by those skilled in the art, the invention has several advantages and may be used within or in conjunction with any of the following devices or systems: tunable optical filters; tunable optical receivers; cascaded tunable optical filters; multi-pass tunable optical filters; an optical signal "slicer" for separating odd and even channels in WDM networks; a tunable wavelength division multiplexer; a tunable add/drop optical filter; a tracking filter for tunable lasers; an intra-cavity filter for tunable lasers; an amplified spontaneous emission noise suppression filter; and an optical spectrum analyzer in a selected waveband, e.g., visible or infrared. The invention may also be used with devices in the UV wavelength spectrum, for instance as an optical spectrum analyzer.

Specific advantages of the invention include its ease of construction, ease of optical and fiber alignment, use of non-specialized optical components (e.g., GRIN lenses), and its ease of optical alignment with low optical loss. These advantages simplify the interferometer, making it less expensive to manufacture as compared to prior art designs. The interferometer of the invention is also very flexible, providing for convenient adjustment of the free spectral range. With its few components, the interferometer of the invention is intrinsically small for coupling to fiber optics; accordingly it may be conveniently placed within a small hermetically sealed package, similar to telecom-grade optical devices.

In still another aspect, the GRIN lenses have optical curvature on the surfaces forming the gap, thereby forming an interferometer as a stable resonator, as known in the art. Such an interferometer provides for higher finesse. In one aspect, the GRIN surfaces forming optical collimation within the gap cavity are coated with one or more reflective coatings. Suitable GRIN lenses of the invention include those made by LightPath Technologies ("Gradium"), NSG America ("SELFOC"), or Casix.

In one aspect, one or more optical fibers are attached to the collimating lens; an input optical fiber brings optical energy to the interferometer and an output optical fiber carries processed optical energy from the interferometer to other devices or systems. In one aspect, the lens includes GRIN lenses that are pre-aligned by a commercial lens vendor, thereby avoiding later assembly.

In still another aspect, the collimating lens includes a deposition of metal (typically gold) on the outer, cylindrical surface (not on the optical surfaces forming collimation). The metal of this aspect creates an electrical capacitor. By way of example, one "plate" of the capacitor is the outer surface of the first GRIN lens, and the second "plate" of the capacitor is the outer surface of the second GRIN lens. The distance between the two GRIN lenses then also serves as the separation between the capacitor plates, as described herein. As the distance between the collimator lenses varies, so does the capacitance across the capacitor. This capacitance is a highly accurate measure of the absolute distance between lens surfaces, and thus provides an active calibration technique.

In an alternative aspect, a metal-cased package is used, rather than a metal deposition, to form the capacitor for calibration.

Yet another aspect of the invention involves a slight modification to the collimator lens discussed above. Specifically, the collimator lens (e.g., GRIN lenses) are more optically stable when formed with curved mirror surfaces (typically spherical surfaces) used in forming the gap. In accord with the invention, such spherical surfaces may be polished onto the collimator lens prior to optical coating. The resulting interferometer function simulates a "symmetric, spherical mirror" resonator, rather than a "flat-flat" resonator, as known in the art. The advantage of using such a resonator is that higher values of finesse are achieved for the same optical coatings (i.e., the optical losses are effectively decreased), leading to increased resolution capabilities for the interferometer.

Another aspect of the invention includes a substantially matched pair of collimator lenses for use in the interferometer. In one aspect, for example, a "0.5-pitch" GRIN lens is used, with fiber coupling on each side. Such a lens transfers light from one fiber to the other; and optimum fiber-to-fiber coupling is achieved to minimize optical losses. Preferably, the 0.5-pitch GRIN lens is cleaved along its center to form two "matched" collimator lenses (i.e., two 0.25-pitch GRIN lenses). The matched lenses have smaller optical losses, generally, than two independently constructed collimators.

In one aspect, the piezoelectric transducer is a multi-layer stack piezoelectric element; in another aspect, the transducer is a monolithic piezoelectric element.

In the preferred aspect of the invention, the collimator lens rests in a V-groove formed in the transducer, which serves to "self-align" the optical axis of the interferometer. By positioning the lens into the V-groove, the interferometer is effectively constructed and aligned in a single step.

In one aspect, the gap distance formed by the lens is coarsely adjusted—by coupling the lens with the transducer—to set the coarse free spectral range for the interferometer. Typical gap distances are between about 10 $\mu$m to 10 mm. Fine adjustment of the gap is then made by applying a voltage across the transducer, thereby expanding or decreasing the gap to adjust the free spectral range. The lens is typically fixed into place with the transducer by a variety of techniques, e.g., by epoxy or mechanical means.

More particularly, when voltage is applied to the piezoelectric transducer, the transducer expands (or contracts) along its axis, such as along the axis of the V-groove, and the collimator lens also moves because it is fixed to the piezoelectric transducer. When the piezoelectric transducer expands, the gap distance increases, which varies the resonant wavelength inside the interferometer. If the piezoelectric transducer contracts, then the gap distance decreases. These expansion and contraction actions provide for optical tuning capability within the interferometer. A typical piezoelectric transducer of the invention expands or contracts by about 1–10 $\mu$m, a distance sufficient to tune the interferometer over a desired wavelength range of about 1–10 optical wavelengths.

One advantage of using a piezoelectric transducer as the mechanism to adjust the gap, as compared to motors or temperature-based techniques, is that the tuning speed is very fast. Accordingly, in accord with the invention, the free spectral range may be obtained more quickly with the piezoelectric element as compared to other motion transducers.

In one aspect, the invention provides a miniature, fiber-coupled Fabry-Perot interferometer with a collimating lens and a wavefront retarder. In accord with this aspect, light energy is coupled to the collimating lens and the collimating lens forms a substantially collimated beam across the gap; the retarder is within the gap and has an optical path length that sets the free spectral range of interference within the gap. Preferably, a controller electrically controls the retarder to set the free spectral range. In certain aspects, the retarder takes the form of a liquid crystal or elecro-optic device.

In a preferred aspect, the invention incorporates passive temperature compensation, as known in the art, into transducer and lens structures to decrease mechanical and optical drifts, and to reduce and/or eliminate the need for a capacitance sensor. Additional optical elements may also be placed within the Fabry-Perot cavity to create additional functionality, as desired.

In accord with the invention, placement of the collimating lenses with the motion transducer sets the "coarse" free spectral range of the interferometer. Generally, this coarse free spectral range is between about 1 nm and 100 nm. Once the coarse free spectral range is set, fine adjustment of the free spectral range is determined by control of an active element, such as the piezoelectric transducer. Generally, this fine adjustment of free spectral range covers between about one and ten wavelengths.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
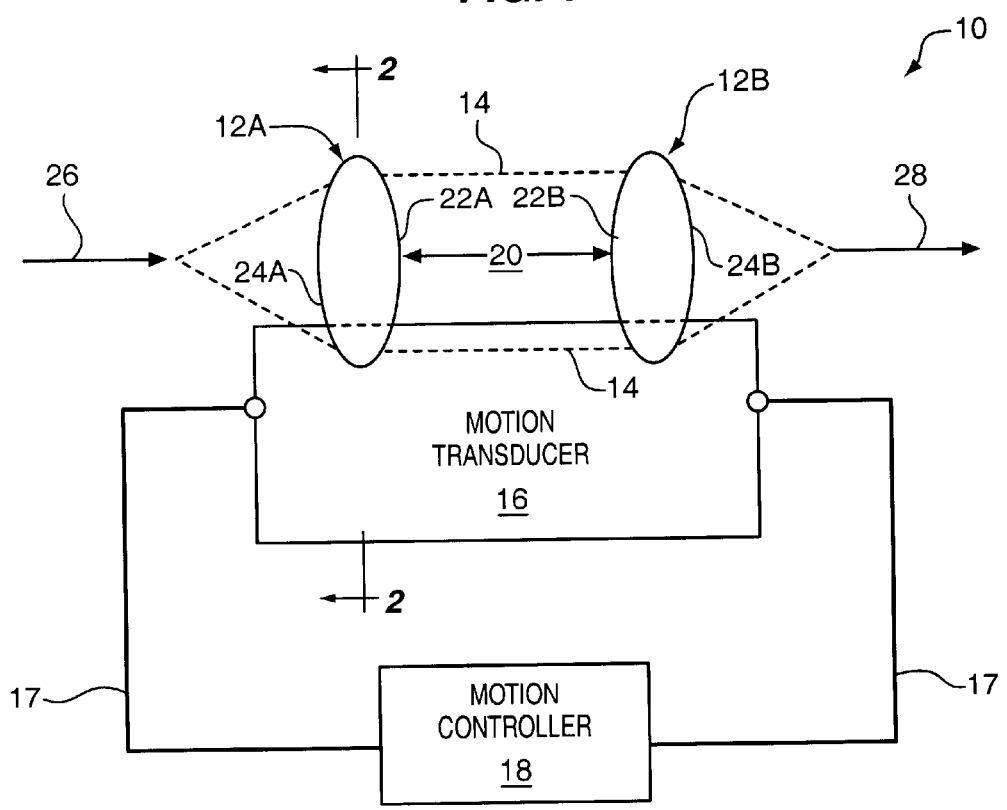
FIG. 1 shows a Fabry-Perot interferometer constructed according to the invention.

FIG. 1 illustrates a side view of interferometer 10 constructed according to the invention. A collimating lens 12 includes lens 12*a* and lens 12*b* to form a collimation of light energy 14 between lenses 12a, 12b. Lenses 12a, 12b are coupled with motion transducer 16; and transducer 16 responds to signals (e.g., voltages) from motion controller 18, via signal lines 17, to adjust the gap 20 between lenses 12a, 12b.

In operation, gap 20 forms a resonator cavity between surfaces 22a, 22b, of lenses 12a, 12b, respectively, as part of interferometer 10. Surfaces 22a, 22b are preferably coated with reflective coatings to enhance the resonance of light energy 14 within gap 20. Surfaces 24a, 24b, of lenses 12a, 12b, respectively, may be coated with anti-reflective coatings. Accordingly, input light energy 26 through interferometer 10 is collimated and interfered, within gap 20, to provide optical filtering as a free spectral range of output light energy 28.

In the preferred embodiment of the invention, motion transducer 16 is a piezoelectric element or piezoelectric stack, and controller 18 is a voltage source. Source 18 in this embodiment applies a voltage across piezoelectric transducer 16 to expand, or alternatively contract, gap 20, thereby adjusting the free spectral range of output energy 28. More particularly, lenses 12a, 12b are affixed to transducer 16 by glue or other attachment to coarsely set the free spectral range of interferometer 10, while fine adjustment of the free spectral range is provided by voltage controlled expansion or contraction of gap 20 via controller 18. As an alternative, those skilled in the art should appreciate that motion transducer 16 may also be a stepper motor or other device to adjust gap 20, as desired.

Figure 2:
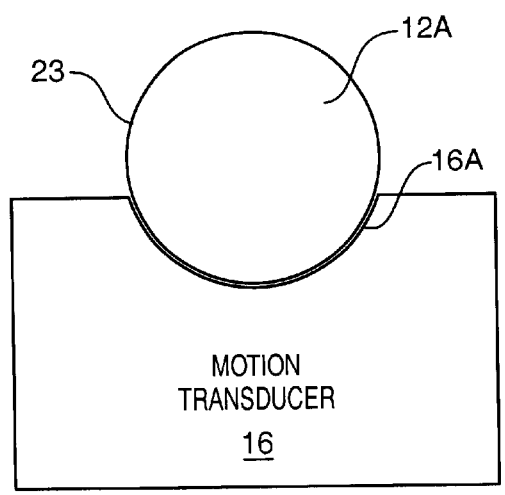
FIG. 2 shows a cross-sectional view of the interferometer of FIG. 1.

Lenses 12a, 12b preferably sit within a shaped contour of transducer 16. FIG. 2 shows a cross-sectional front view of interferometer 10, and specifically illustrates shaping 16a of transducer 16 to match the contour 23 of lens 12a. By way of example, by carefully forming piezoelectric contour 16a, optical alignment of lenses 12a, 12b is simultaneously achieved when bonding lenses 12a, 12b to transducer 16. Generally, lenses 12a, 12b are cylindrical in shape; however other shapes may be formed, with like contours in transducer 16, without departing from the scope of the invention.

Figure 3:
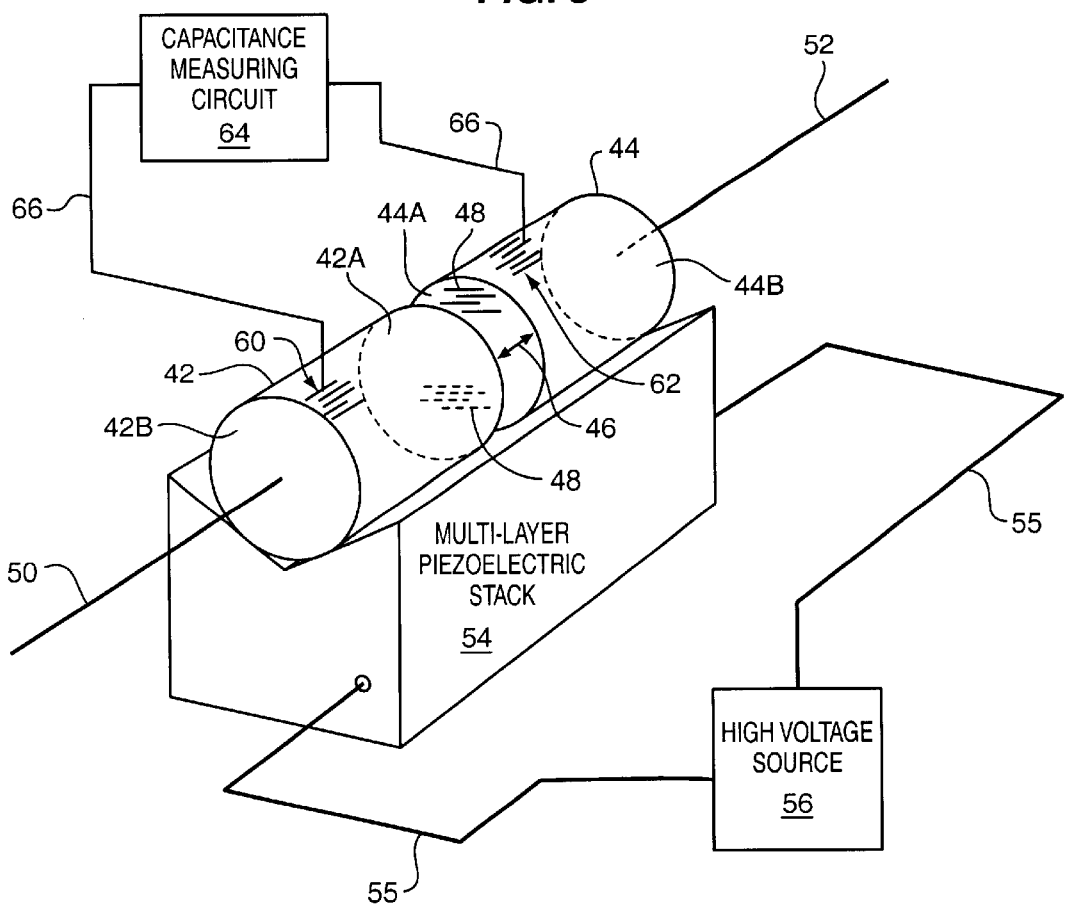
FIG. 3 shows a perspective view of one fiber-based interferometer of the invention.

FIG. 3 shows a perspective view of a GRIN-based Fabry-Perot interferometer 40 of the invention. Interferometer 40 has a first GRIN lens 42 and a second GRIN lens 44 forming, therebetween, a high finesse optical resonant cavity gap 46. As above, GRIN lenses 42, 44 preferably have highly reflective coatings 48 applied to surfaces 42a, 44a of lenses 42, 44, respectively. GRIN lens 42 is optically coupled to input optical fiber 50, at input surface 42b, and GRIN lens 44 is coupled to output optical fiber 52, at output surface 44b, as shown. In operation, light energy input through fiber 50 interferes within gap 46 and results in output light energy of selected free spectral range along output fiber 52. The free spectral range is adjusted by applying voltage to the piezoelectric transducer 54, via signal lines 55, by high voltage source 56. Transducer 54 is preferably a multi-layer piezoelectric stack.

Preferably, GRIN lens 42 has a metal electrode 60 and GRIN lens 44 has a metal electrode 62. Electrodes 60, 62 do not, preferably circumferentially surround lenses 42, 44, respectively. Electrodes 60, 62 couple to capacitance measuring circuit 64 via signal lines 66. By monitoring capacitance across gap 46, an accurate measure of the physical width of gap 46 may be known, as desired, for absolute position calibration and/or optical alignments.

As an alternative to FIG. 3, reflective coatings may be made on surfaces 42b, 44b, to form the resonant cavity between these surfaces; as another alternative to FIG. 3, additional optical elements may be placed within gap 46, as desired, to facilitate collimation.

Figure 4:
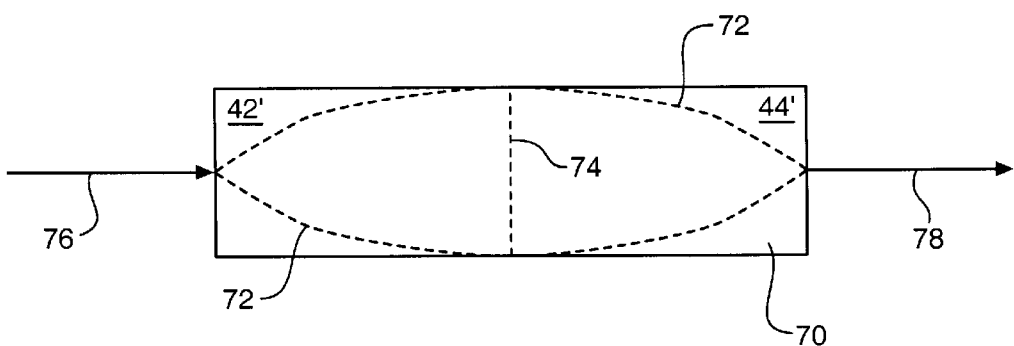
FIG. 4 illustrates forming one "matched pair" of GRIN lenses, suitable for use within the interferometer of FIG. 3.

FIG. 4 shows a GRIN element 70 suitable for use in forming lenses 42, 44 of FIG. 3. Specifically, GRIN element 70 is a full, half wave GRIN lens, as illustrated by optical wavefront 72. By severing element 70 in half at line 74, element 70 becomes a matched pair of lens elements 42', 44' suitable for use as elements 42, 44, FIG. 4. In operation, as shown in FIG. 5, elements 42' 44' are separated at line 74 to form the interference gap, e.g., gap 46, FIG. 3, so that light energy 76 entering element 42' expands for interference within the gap and thereafter exits from element 44' as light energy 78.

For convenience, a metal coating such as coating 60, 62, FIG. 3, is preferably formed onto element 70, and across both elements 42', 44', prior to severing element 70 at line 74. This facilitates circumferentially re-aligning element 42', 44' with the motion transducer so that they remain substantially in the same orientation to one another as they were as a single monolithic element 70.

Figure 5:
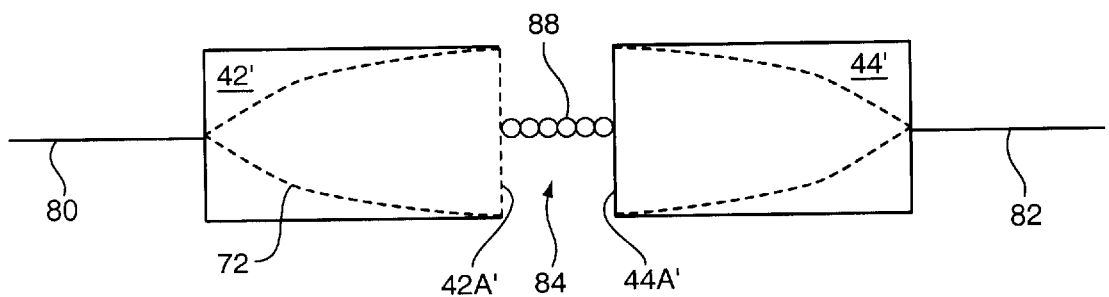
FIG. 5 shows one GRIN Fabry-Perot cavity constructed according to the invention.

FIG. 5 shows elements 42', 44' in use and coupled to fibers 80, 82, respectively, to form a Fabry-Perot cavity 84. As above elements 42', 44' are preferably coated with optical reflection coatings on surfaces 42a' and 44a' to facilitate optical resonance 88 of light energy injected into element 42' via fiber 80. By adjusting the width of cavity 84, the free spectral range of output energy into fiber 82 is selected. Collimation of light energy within cavity 84 facilitates choice and adjustment of the free spectral range.

Figure 6:
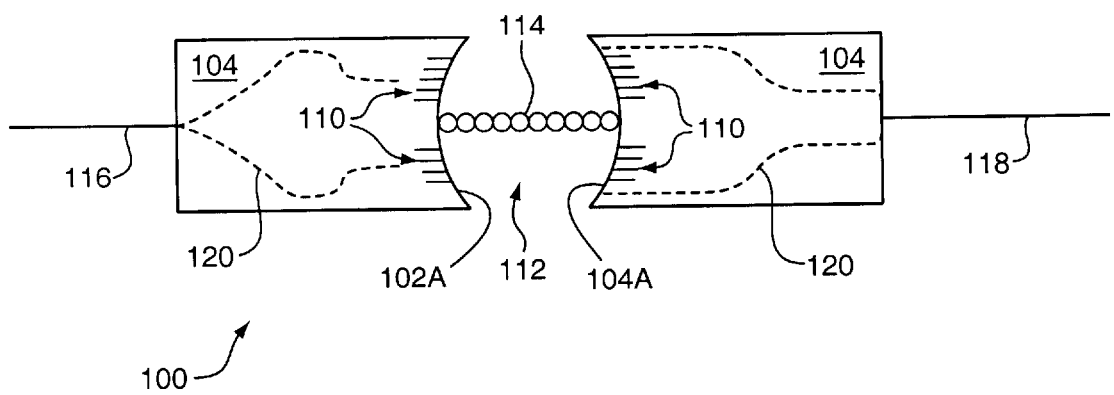
FIG. 6 shows another GRIN Fabry-Perot cavity of the invention.

Imperfect alignment between elements 42', 44', and reflection inefficiencies of coatings applied to surfaces 42a', 44a', may limit the finesse achievable in the design of FIG. 5. For finesse values of 6,200–12,500, for example (which corresponds to free spectral ranges of 50 nm–100 nm for a transmission linewidth of 1 GHz), it may be extremely difficult to obtain desired operation in the Fabry-Perot configuration of FIG. 5. Therefore, an optically stable configuration may be selected by forming the GRIN elements with powered surfaces forming Fabry-Perot cavity 112. FIG. 6 shows such an alternative interferometer 100 of the invention to form a stable confocal (or near confocal) Fabry-Perot cavity. Specifically, in FIG. 6, GRIN elements 102, 104 have curved surfaces 102a, 104a, with highly reflective coatings 110, and form a resonant cavity 112 of stable interference 114 between surfaces 102a, 104a. As such, light energy from input fiber 116 is filtered to a desired free spectral range into output fiber 118, as desired, by control of gap 112 between surfaces 102a, 104a, as described herein. Preferably, GRIN elements 102, 104 are not "matched" as in FIG. 5; rather, GRIN elements 102, 104 are designed to achieve mode matching of internal wavefronts 120.

Figure 7:
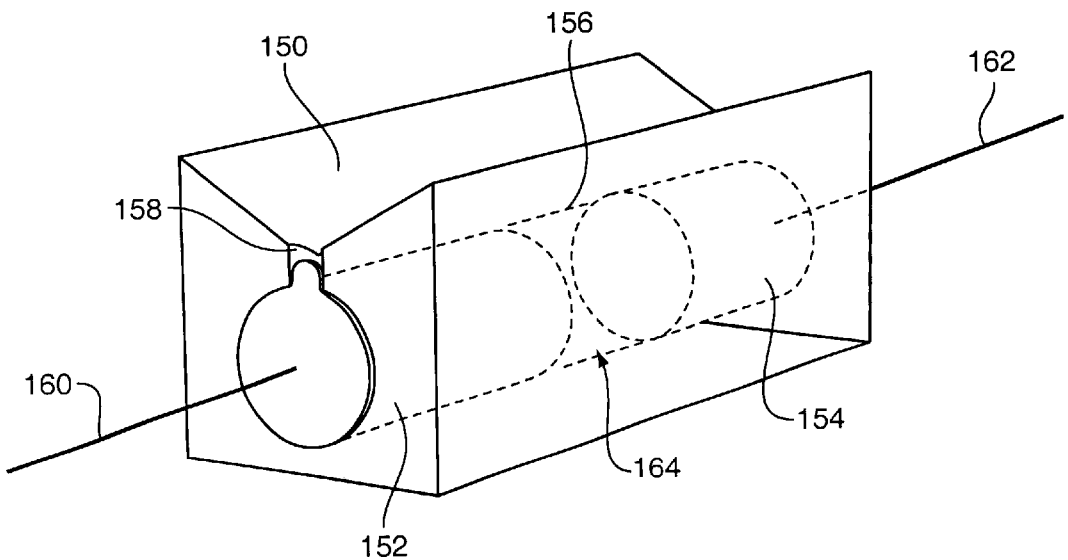
FIG. 7 shows a ferrule-type Fabry-Perot cavity holder of the invention.

FIG. 7 shows a motion transducer 150 functioning as a "ferrule-type" holder of collimating lenses 152, 154 (e.g., GRIN elements 42, 44). Transducer 150 is for example a piezoelectric stack, as above, and includes a hollow cylindrical cavity 156 to accommodate elements 152, 154. A UV epoxy 158 applied to elements 152, 154 is cured to fix elements 142, 154 within cavity 156 when the desired coarse free spectral range is achieved. As above, fibers 160, 162 coupled into and out of elements 152, 154, respectively, provide for processing optical energy between elements 152, 154 and within cavity 156. Antireflection coatings may be used as desired to reduce spurious reflections; and reflective coatings are again used on surfaces forming the resonant Fabry-Perot cavity. Fine adjustment of spacing within gap 164 between elements 152, 154 may be made by altering the applied voltage to transducer 150.

Figure 8:
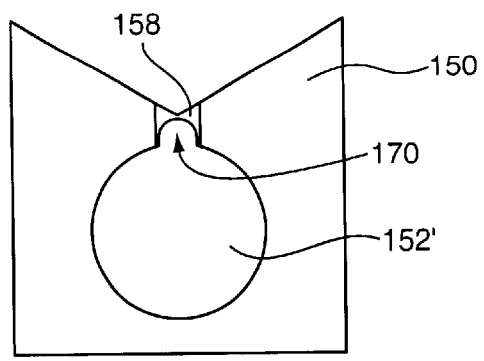
FIG. 8 shows an alignment nub used to stabilize a collimating lens within the holder of FIG. 7.

Certain improvement may be achieved by designing an alignment nub with elements 152, 154 to maintain alignment to transducer 150. Such a nub 170 is for example shown in FIG. 8—showing an end view of element 152' with transducer 150—and may fit snugly in the space provided for epoxy 158.

Figure 9:
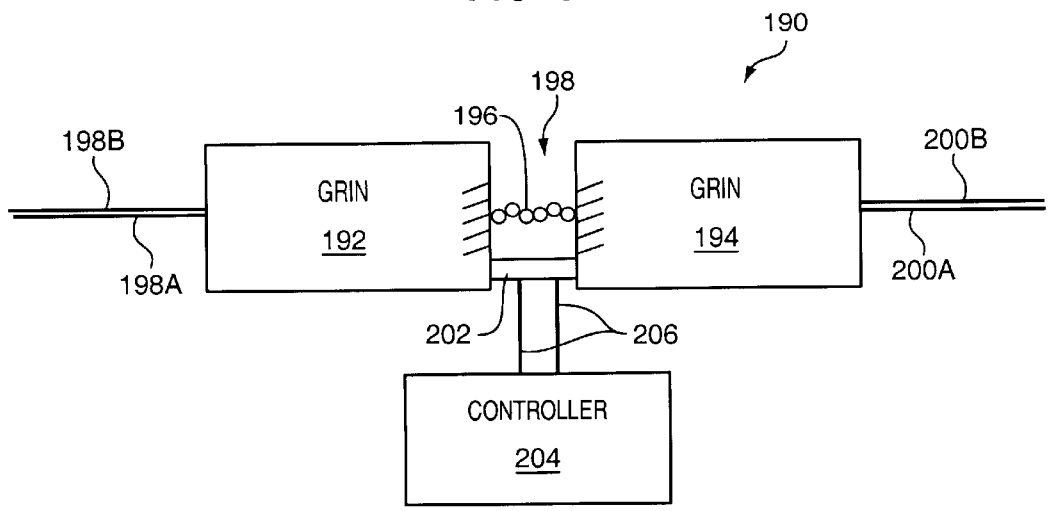
FIG. 9 shows an alternative Fabry-Perot cavity with active selection of free spectral range provided by a non-piezoelectric device.

FIG. 9 shows a Fabry-Perot cavity 190 suitable to provide active tuning in accord with the teachings herein. Cavity 190 includes GRIN elements 192, 194, as above, to form collimated light and resonance 196 in a gap 198, from input fiber 198 to output fiber 200. A motion transducer 202 in the form of a MEMS or linear motor device between the mirror surfaces 192a, 194a provides the drive to adjust the dimension of gap 198, as desired. In the preferred embodiment, a controller 204 connected to transducer 202 provides drive signals, via signal lines 206, to electrically select the gap dimension. Motion transducer 202 can alternatively include other mechanical drive systems.

Those skilled in the art should appreciate that fibers 198, 200 (and other fibers discussed above) may be constructed as multiple fibers, as shown for example in FIG. 9 as fibers 198a, 198b, 200a, 200b, providing additional optical paths through the interferometer of the invention. Such embodiments may find use in wavelength division multiplexing ("WDM"), as known in the art, or so as to accommodate multiple wavelengths through the interferometer. Two or more fibers may be used for these purposes.

Figure 10:
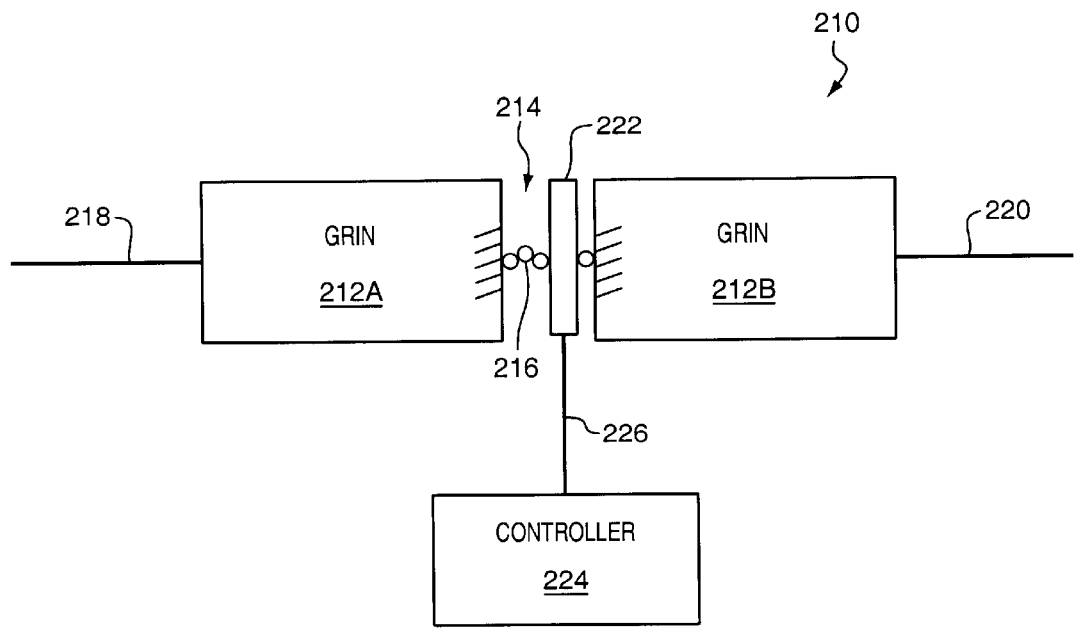
FIG. 10 shows a Fabry-Perot wavefront retarding interferometer, constructed according to the invention.

FIG. 10 shows a Fabry-Perot interferometer 210 constructed according to the invention. As above, a pair of GRIN lenses 212a, 212b forms a gap 214 to set the free spectral range through interference 216. Light enters interferometer 210 by fiber 218; filtered light leaves interferometer 210 by fiber 220. A wavefront retarder 222 (e.g., a liquid crystal or electro-optic device) is arranged within gap 214 to selectively modify the optical path length within gap 214 so as to adjust the free spectral range. In this way, retarder 222 takes the place of motion transducer 16, FIG. 1. Preferably, a controller 224 transmits signals to retarder 222, via signal line 226, to set the path length to achieve the desired free spectral range.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention, what is claimed is:

1. A tunable Fabry-Perot interferometer, comprising:
   a first collimating lens having a first optically reflective surface;
   a second collimating lens having a second optically reflective surface, the first and second surfaces forming an interferometric gap to define a free spectral range and being arranged to substantially collimate light within the gap; and
   a motion transducer coupled with the first and second lenses for controlling gap dimensions to adjust the free spectral range selectively.

2. An interferometer of claim 1, wherein one or more of the first and second optical surfaces comprise a reflective coating.

3. An interferometer of claim 2, wherein the reflective coating comprises gold.

4. An interferometer of claim 1, wherein each of the first and second optical surfaces comprises a multi-layer reflective coating.

5. An interferometer of claim 1, wherein the first and second lenses comprise first and second gradient index lenses.

6. An interferometer of claim 5, wherein the first and second gradient index lenses form a pair of quarter wave optical elements.

7. An interferometer of claim 6, wherein the first and second gradient index lenses are constructed and arranged to collimate the light from a point source arranged adjacent to the first gradient index lens.

8. An interferometer of claim 7, wherein the first and second gradient index lenses are constructed and arranged to generate an approximate 1:1 image of the first point source to a point source image adjacent the second gradient index lens.

9. An interferometer of claim 5, further comprising first and second optical fibers, the first optical fiber coupled to the first gradient index lens and providing light energy for the interferometer, the second optical fiber coupled with the second gradient index lens and relaying processed light energy from the interferometer to external optical components.

10. An interferometer of claim 5, wherein the first and second gradient index lenses each comprise a cylindrical optical element.

11. An interferometer of claim 10, wherein the first and second gradient index lenses are both formed from a monolithic cylindrical optical element.

12. An interferometer of claim 5, further comprising a first optical fiber for coupling light to the first gradient index lens.

13. An interferometer of claim 5, further comprising a second optical fiber for coupling light from the second gradient index lens.

14. An interferometer of claim 1, wherein the motion transducer comprises a piezoelectric structure for supporting the first and second lenses, the piezoelectric structure being coupled to power to expand or contract as a function of applied voltage, thereby adjusting the gap to a selected free spectral range.

15. An interferometer of claim 14, wherein the piezoelectric structure comprises a multi-layer stack of piezoelectric elements.

16. An interferometer of claim 14, wherein the structure comprises a V-groove for supporting the first and second lenses in optical alignment.

17. An interferometer of claim 14, wherein the structure forms a cylindrical cavity for supporting the first and second lenses in optical alignment within the structure.

18. An interferometer of claim 17, further comprising hardened epoxy for securing part of at least one of the lenses within the cavity.

19. An interferometer of claim 17, wherein at least one of the lenses comprises a nub for ensuring alignment to the structure.

20. An interferometer of claim 1, further comprising a first metal coating, on the outside of the first lens, and a second metal coating, on the outside of the second lens, the first and second metal coatings providing a capacitive measurement in calibrating positions of the first and second lenses.

21. An interferometer of claim 1, wherein the first and second surfaces comprise optical power to form a stable cavity in the gap.

22. An interferometer of claim 1, wherein the motion transducer comprises a MEMS or linear motor device, coupled with power, for controlling spacing within the gap.

23. An interferometer of claim 1, wherein the collimating lenses are constructed and arranged to collimate the light from a point source.

24. A tunable Fabry-Perot interferometer, comprising:
   a first collimating lens having a first optically reflective surface;
   a second collimating lens having a second optically reflective surface, the first and second surfaces forming a gap; and
   a wavefront retarder, within the gap, for adjusting optical path length across the gap, wherein a free spectral range is defined by interference within the gap.

25. An interferometer of claim 24, wherein the wavefront retarder comprises one of a liquid crystal device and an electro-optic device.

26. An interferometer of claim 24, further comprising a controller for varying the optical path length of the wavefront retarder to set the free spectral range selectively.

27. An interferometer of claim 24, wherein one or more of the first and second optical surfaces comprise a reflective coating.

28. An interferometer of claim 27, wherein the reflective coating comprises gold.

29. An interferometer of claim 24, wherein each of the first and second optical surfaces comprises a multi-layer reflective coating.

30. An interferometer of claim 24, wherein the first and second lenses comprise first and second gradient index lenses.

31. An interferometer of claim 30, wherein the first and second gradient index lenses form a pair of quarter wave optical elements.

32. An interferometer of claim 31, wherein the first and second gradient index lenses are constructed and arranged to collimate the light from a point source arranged adjacent to the first gradient index lens.

33. An interferometer of claim 32, wherein the first and second gradient index lenses are constructed and arranged to generate an approximate 1:1 image of the first point source to a point source image adjacent the second gradient index lens.

34. An interferometer of claim 30, further comprising a first optical fiber for coupling light to the first gradient index lens.

35. An interferometer of claim 30, further comprising a second optical fiber for coupling light from the second gradient index lens.

36. A method for filtering light energy to a selected free spectral range, comprising the steps of: collimating and interfering the light energy between collimating lenses and controlling spacing between the lenses with one or more piezoelectric elements to define a free spectral range.

37. A method of claim 36, further comprising providing one or more reflective coatings on the lenses to form an interference gap between the lenses.

38. A method of claim 36, wherein the steps of collimating and interfering the light energy between collimating lenses comprises collimating and interfering the light energy between gradient index lenses.

39. A method of claim 38, further comprising providing first and second gradient index lenses as a pair of quarter wave optical elements.

40. A method of claim 36, further comprising providing the light energy from a first optical fiber, prior to the steps of collimating and interfering.

41. A method of claim 36, further comprising capturing filtered light energy, from the lenses, by a second optical fiber.

42. A method of claim 36, further comprising aligning the lenses to the one or more piezoelectric elements by forming a groove within the one or more piezoelectric elements and coupling the lenses to the groove.

43. A method of claim 36, further comprising the steps of providing a first metal coating on the outside of a first lens, and forming a second metal coating on the outside of a second lens, and measuring capacitance to calibrate spacing between the lenses.

44. A method for filtering light energy to a selected free spectral range, comprising the steps of: collimating and interfering the light energy between collimating lenses and controlling optical path length between the lenses by a wavefront retarder, between the collimating lenses, to define the free spectral range.

45. A method of claim 44, wherein the step of controlling optical path length comprises utilizing one of a liquid crystal device or an electro-optic device.

* * * * *